April 6, 1948.　　　　　E. POHLE　　　　　2,439,186
MECHANICAL SUPPORT FOR INSULATORS
Filed Sept. 26, 1945

Eric Pohle　INVENTOR
BY Charles W. Mortimer

Patented Apr. 6, 1948

2,439,186

UNITED STATES PATENT OFFICE 2,439,186

MECHANICAL SUPPORT FOR INSULATORS

Eric Pohle, Clifton, N. J., assignor to Allen B. Du Mont Laboratories, Inc., Passaic, N. J., a corporation of Delaware Application September 26, 1945, Serial No. 618,654

1 Claim. (Cl. 174—158)

This invention relates to a device for mechanically supporting insulators by means of metal in vacuum tubes without using cement or fusing the insulators to the metal. The insulators may, for example, be tubes that are supported at each end by metallic supports extending into these ends.

While the invention is particularly suitable for mechanically supporting insulators in vacuum tubes without using cement or fusing the metal to the insulators, it is not restricted to this particular use.

In carrying out the invention, metal holders or supports are provided for the insulator, which is preferably tubular, in such a manner that these fasteners or supports can be readily inserted into the insulators and attached to the same in such a manner that the insulators are securely held in place without danger of becoming loose or being detached.

The invention may be understood from the description in connection with the accompanying drawing, in which.

Figure 1:
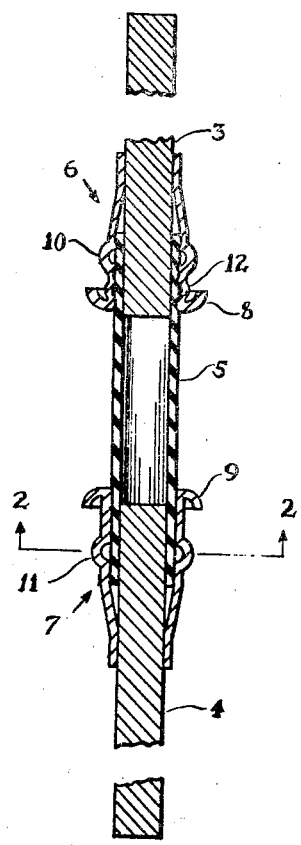
Fig. 1 is a longitudinal section through an embodiment of the invention.
Figure 2:
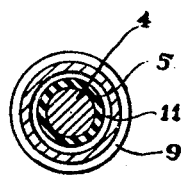
Fig. 2 is a section along the line 2—2 of Fig. 1.

In the drawing, reference characters 3 and 4 indicate metal supports in the form of straight rods that may be used for supporting the tube of insulating material 5 by having the ends of these metal rods inserted some distance into the ends of the insulating tube 5.

Metallic fastening members 6 and 7 are provided at each end of the tube 5 and overlap at least a portion of these ends into which the metal rods or supports 3 and 4 extend.

The metallic members 6 and 7 are provided at their ends, into which the tube 5 is inserted, with openings sufficiently large to receive the tube 5, the ends of tube 5 having close fits around the rods 3 and 4.

Flanges 8 and 9 that are preferably curved are provided at the ends of the members 6 and 7, and enlarged rings 10 and 11 are provided, respectively, on these fastening members.

The fastening members 6 and 7 are placed near the ends of the rods 3 and 4 and these ends are then inserted into the insulating tube 5 the desired distance and the large end of the members 6 and 7 are slipped over the ends of the tube 5.

In order to clamp the tube 5 on the ends of the rods 3 and 4 pressure is applied to opposite ends of each one of the fastening members 6 and 7 sufficient to crimp the same as indicated at 12 for the fastening member 6 and frictionally hold them in place. This may be done, for example, by means of pliers the jaws of which are applied to the opposite ends of the members 6 and 7. This crimping securely clamps the large ends of the fastening members 6 and 7 to the corresponding ends of the tube 5, thereby securely clamping these ends to the metal rods or supports 3 and 4.

The rods 3 and 4 are thereby in position with respect to each other and are insulated from each other.

What is claimed is:

A device for supporting a hollow cylindrical insulator, which comprises a cylindrical metal rod having its end fitting in the end of said hollow insulator and terminating in said insulator and a short hollow metal fastener on said rod having a crimp tightly fitting around the same end of said hollow insulator.

ERIC POHLE.

REFERENCES CITED

The following references are of record in the file of this patent:

UNITED STATES PATENTS

| Number | Name | Date |
|---|---|---|
| 482,872 | Lee | Sept. 20, 1892 |
| 777,215 | Meston | Dec. 13, 1904 |
| 829,416 | McGill | Aug. 28, 1906 |
| 946,779 | Hubbell | Jan. 18, 1910 |
| 1,031,453 | Lange et al. | July 2, 1912 |
| 1,035,212 | McCarthy | Aug. 13, 1912 |
| 1,080,713 | Mead | Dec. 9, 1913 |
| 1,651,783 | Trogner | Dec. 6, 1927 |
| 1,699,744 | Marbury | Jan. 22, 1929 |
| 1,725,122 | Aalborg | Aug. 20, 1929 |
| 2,048,504 | Hawley | July 21, 1936 |